(12) United States Patent
Michaluk, III (10) Patent No.: US 9,366,563 B2
(45) Date of Patent: Jun. 14, 2016

(54) SCALE ASSEMBLY FOR PROVIDING IMPROVED ACCURACY DURING METERING OF FLUID FROM A LIQUID OR GAS DELIVERY TANK

(71) Applicant: Mitchell W. Michaluk, III, Milan, MI (US)

(72) Inventor: Mitchell W. Michaluk, III, Milan, MI (US)

( * ) Notice: Subject to any disclaimer, the term of this patent is extended or adjusted under 35 U.S.C. 154(b) by 105 days.

(21) Appl. No.: 14/478,308

(22) Filed: Sep. 5, 2014

(65) Prior Publication Data
US 2015/0060155 A1 Mar. 5, 2015

Related U.S. Application Data

(60) Provisional application No. 61/874,238, filed on Sep. 5, 2013.

(51) Int. Cl.
*G01G 17/04* (2006.01)
*G01G 23/01* (2006.01)

(52) U.S. Cl.
CPC .............. *G01G 17/04* (2013.01); *G01G 23/01* (2013.01)

(58) Field of Classification Search
CPC ....... G01G 17/04; G01G 17/06; G01G 23/01; G01G 3/36
USPC ......................................................... 177/246
See application file for complete search history.

(56) References Cited

U.S. PATENT DOCUMENTS

| | | | | |
|---|---|---|---|---|
| 3,587,760 A * | 6/1971 | Puhringer et al. | ..... | B22D 41/12 177/141 |
| 4,002,215 A * | 1/1977 | Harvill | ..... | G01F 23/20 177/126 |
| 4,589,507 A * | 5/1986 | Curran | ..... | G01G 21/23 177/138 |
| 4,691,793 A * | 9/1987 | Kumakura | ..... | G01F 23/20 177/210 R |
| 5,369,222 A * | 11/1994 | Strelioff | ..... | G01G 19/10 177/136 |
| 5,393,936 A * | 2/1995 | Tyhy | ..... | G01G 19/12 177/138 |
| 5,578,798 A * | 11/1996 | Nuyts | ..... | G01G 19/12 177/136 |
| 5,635,680 A * | 6/1997 | Dojan | ..... | G01G 19/08 177/136 |
| 5,789,714 A * | 8/1998 | Doerksen | ..... | G01G 19/12 177/141 |
| 5,941,090 A * | 8/1999 | Knutson | ..... | F17C 13/002 165/138 |
| 6,119,475 A * | 9/2000 | Murray | ..... | B60H 1/00585 177/130 |
| 6,180,892 B1 | 1/2001 | Li | | |
| 6,541,714 B2 | 4/2003 | Montagnino | | |
| 7,196,276 B1 | 3/2007 | Cope | | |
| 7,499,581 B2 | 3/2009 | Tribble et al. | | |
| 7,528,329 B2 * | 5/2009 | Nuyts | ..... | G01G 19/08 177/136 |
| 7,541,549 B2 | 6/2009 | Estes et al. | | |
| 7,683,271 B2 | 3/2010 | Newton | | |
| 8,919,210 B2 * | 12/2014 | Kjar | ..... | G01G 17/00 73/862 |
| 2015/0231583 A1* | 8/2015 | Maguire | ..... | B01F 15/0445 366/141 |
| 2015/0233756 A1* | 8/2015 | Maguire | ..... | F04B 19/22 222/56 |

* cited by examiner

*Primary Examiner* — Randy W Gibson
(74) *Attorney, Agent, or Firm* — Dinsmore & Shohl LLP (57) ABSTRACT

A scale assembly for determining a weight and converted volume of fluid and gas withdrawn from a tank. A plurality of lift cylinders and cam linkages are arranged in paired and perimeter spaced fashion about a perimeter of the tank in extending fashion through an associated support flange. The cam linkages are normally biased in a first position to restrain the tank into contact with the support surface, the linkages being actuated in a second position to release the tank for subsequent elevation by the lift cylinders. A load cell is arranged in communication between each of the lift cylinders and the pallet support surfaces and, upon being recalibrated following tank elevation, measures the weight and converted volume of the delivered fluid.

17 Claims, 8 Drawing Sheets

SCALE ASSEMBLY FOR PROVIDING IMPROVED ACCURACY DURING METERING OF FLUID FROM A LIQUID OR GAS DELIVERY TANK

CROSS-REFERENCE TO RELATED APPLICATIONS

This Application claims the benefit of U.S. Provisional Application 61/874,238 filed on Sep. 5, 2013, the contents of which are incorporated herein in its entirety.

FIELD OF THE INVENTION

The present invention relates generally to metering devices for reading volumetric delivery of fluids, such as liquid and gas, delivered from a pressurized tank. More specifically, the present invention discloses a scale assembly incorporating a plurality of perimeter arranged and combination air cylinder/load cell subassemblies. These operate in combination with cam operated and spring loaded hold down linkages in order to successively release and elevate a delivery tank above a platform supporting surface in order to zero out an associated electronic scale, following which more accurate weight based metering of a volume of delivered fluid can be accomplished than which is currently available with conventional liquid flow meters.

BACKGROUND OF THE INVENTION

The prior art is documented with numerous examples of weighing scales and apparatuses. A first example of this is the truck mounted scale mechanism of U.S. Pat. No. 7,196,276 to Cope for measuring the weight of loose material and which teaches the scale mechanism supported upon the tailgate of a delivery truck with a winch for deploying the scale from the transport position. The scale includes a frame mechanism pivotally supporting a hopper having a gate-controlled discharge chute operated by an air cylinder with weight cells located between the hopper and the frame. A computer on the scale mechanism operatively controls the air cylinder controlling the gate on the delivery chute of the truck bed, the air cylinder controlling the discharge chute gate on the hopper such that the loading, weighing and dispensing of the loose salt from the truck bed to the customer storage facility is automated until the system is halted by the operator.

U.S. Pat. No. 7,499,581, to Tribble et al., teaches a vision system for calculating a volume of fluid disposed within a container. An imaging device captures and stores an image of at least the volume of fluid in the container. A background is disposed behind the container such that at least the volume of fluid in the container is disposed in front of the background and a processor performs at least one operation on the stored image to calculate the volume of the fluid within the container.

Estes, U.S. Pat. No. 7,541,549, teaches a vacuum transfer apparatus having a load isolation weighing system including a rigid pipe section pivotally mounted to a support frame. A weighing hopper is mounted to the frame via at least one load cell. The weighing hopper is provided with an inlet connected via a product line to a product inlet hopper and a sliding outlet gate. An actuator valve is operatively connected to the weighing hopper and to a vacuum source.

A controller is operatively connected to the actuator valve and also controls the opening and closing of the sliding gate. The product line includes a flexible pipe section and a rigid pipe section pivotally mounted to the frame at a pivot disposed substantially vertically below the center of the flexible pipe section. In this fashion, and upon an operator keying into the controller a target rate of product transfer and a target weight of product in the weighing hopper, the actuator valve applied a vacuum to the weighing hopper in order to transfer the product from the inlet hopper to the weighing hopper. Upon reaching the preset target weight of product in the weighing hopper, the actuator valve bleeds off the vacuum in the weighing hopper before the load cells weigh the product contained in the weighing hopper.

Newton, U.S. Pat. No. 7,683,271, teaches a system for accurately weighing a mass of material, including a closed chamber having a gas inlet and a gas outlet. A scale is disposed in the closed chamber. An inert gas supply, under positive pressure, is connected to the gas inlet and a vacuum powered pressure regulator is connected to the gas outlet to maintain a predetermined pressure level within the closed chamber and to substantially inhibit pressure fluctuations within the chamber that may affect accuracy of the scale.

Montagnino, U.S. Pat. No. 6,541,714, teaches a scale with a holographic projector including a weight measurement device to which the projector is coupled. Activation of the weight measurement device activates the projector which projects into mid-air a holographic image indicative of a weight of an object being measured. Optionally, the scale may include a display coupled to the weight measurement device.

Finally, U.S. Pat. No. 6,180,892 to Li teaches a mixing scale including a base which supports a scale pan in horizontal position. The scale pan supports a receiver container for holding the contents of that which is to be weighed. The mixing scale includes a backing member extending upwardly from the base including an output display for presenting measurement values produced by the scale. A visual flow monitoring device such as a reflector is placed proximate to the output display to allow a user of the mixing scale to monitor the measurement value presentation and flow of an additive being delivered into the receiver container simultaneously, or without requiring, a physical shift in position by the user which might otherwise disrupt the delivery operation.

SUMMARY OF THE INVENTION

The present invention discloses a scale assembly for determining a weight and converted volume of fluid and gas withdrawn from a tank. At least one lift cylinder is provided in contact with a lower supporting location associated with the tank. At least one cam driven linkage is normally biased in a first position to restrain the tank into contact with a support surface, the linkage being actuated in a second position to release the tank for subsequent elevation by the lift cylinder. A load cell subassembly is provided, such as arranged between the underside of the tank and outer supporting lip edge and the lower pallet supporting surface, the load cell being recalibrated (zeroed out) upon elevating the tank in order to measure a weight of a fluid delivered therefrom.

In a preferred variant, a plurality of lift cylinders and cam linkages are arranged in paired and perimeter spaced fashion about a perimeter of the tank support location. Each of the lift cylinders further includes a cylindrical shaped covering cap incorporating an upper positioned air cylinder and an intermediate located load cell, a lower extending load cell button associated with the load cell seating within a recess associated with an upward projecting cone forming an aligning platform support location.

Each of the load cells is displaceable relative to an inner vertical surface of the covering cap in a manner which ensures that it does not rub there against and so as to not compromise the accuracy of the digital reads resulting therefrom. The covering cap is bolted to a base of the tank flange in surrounding and aligning fashion with an interior aperture of the flange and through which upwardly projects the seating cone. Upper located mounting bolts are provided for securing the air cylinder to the upper inner end of the cap.

Additional features include a nipple engageable attachment fitting projecting from the air cylinder through the cap and adapted to receive a pressurized air supply. A separate fitting extends from the load cell and projects through an opening defined in the vertically extending sidewall of the covering cap, the fitting adapted to being connected by an input associated with a digital scale module.

Each of the cam linkages may further include a spring loaded cylinder establishing a pivotal interconnection at a lower end with a pedestal support bracket, and at an upper end with a lever arm, in turn established in rotary engagement with a cam associated with a shaft extending between end supports which are likewise supported upon the support surface and extend through additional aligning apertures in a flange associated with the lower tank supporting location. A pressurized air or gas from a tank or other fluid source communicated to the spring loaded cylinder counter-acts a rotating force exerted by the spring cylinder against the cam in a normally hold down or locking position, and in order to execute a counter rotation to thereby rotate unseat an abutting ledge surface of the cam from a hold-down contact established with an upper surface of the tank support flange to a release position allowing for subsequent elevation of the tank by the lift cylinders a nominal distance sufficient to zero out a digital scale module and to permit measurement of withdrawn fluid, with weight to volumetric conversion to determine a volume of fluid delivered to the customer. Upon termination of the air pressurization force to all of the lift cylinders and the spring loaded cylinder, the tank and flange re-seating upon the pallet support location and the spring loaded cylinder rotating the cam back into hold-down position in a fail-safe lock mode.

Additional features include each of the cam linkages having a rotary actuator exhibiting a three dimensional rectangular housing, through which extends a cylindrical cross sectional and elongated support. A cam component is supported upon an exterior face of the rotary actuator and through which extends a further shaft with a keyed end, the same being in turn supported by a pillow block bearing for providing an optional extra degree of support. The cam can be rotated over a desired angular range in order to provide either hold-down or release of the fluid delivery tank to be elevated by the perimeter located air cylinders.

Yet additional features include each of the cam linkages further having a horizontally disposed wedge component arranged in end displaceable engagement with a spring containing air lift cylinder, the lift cylinder pivotally supported to a bracket in turn is mounted to a surface location of the underlying pallet and which passes through an aligning recessed defined in the lower support location associated with the tank. The spring containing air cylinder, upon being provided with an input pressurized fluid source, causes the wedge component to retract, via an intermediate pivotal interconnecting structure mounted to the end of a linearly displaceable shaft associated with the spring loaded cylinder. A seating pocket defined in a projection of the support surface passes through the pallet support location such that, in a fluid pressurizing (energized/retracted) position, forward most extending fingers of the wedge component are unseated from the seating pocket and such that, in the retracted position, align only through a doorway defined in a tower portion arranged in spaced aligning fashion with the projection.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Referring now to FIGS. 1-5, the present invention discloses a metering assembly for reading volumetric delivery of fluids, such as liquid and gas, delivered from a pressurized tank. More specifically, the present invention discloses a plurality of individual subassemblies, each of which incorporating a perimeter arranged air cylinder/load cell, in combination with a cam operated and spring loaded hold down linkages in order to successively release and elevate a delivery tank above a platform supporting surface. This is again accomplished in order to zero out an associated electronic scale, following which more accurate weight based metering of a volume of delivered fluid can be accomplished than which is currently available with conventional liquid flow meters.

Figure 1:
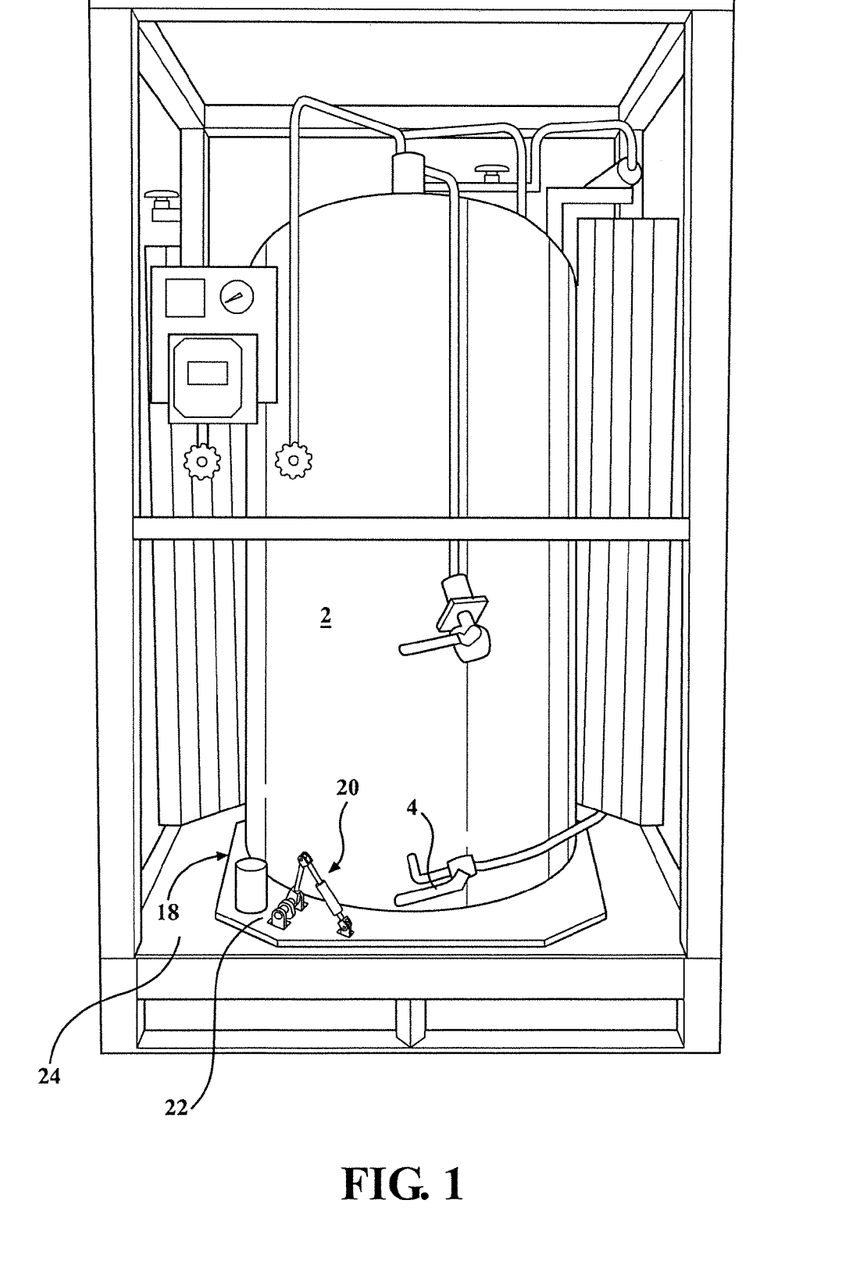
FIG. 1 is an environmental view of a pressurized fluid delivery tank with which is incorporated the scale assembly according to the present invention.
Figure 1A:
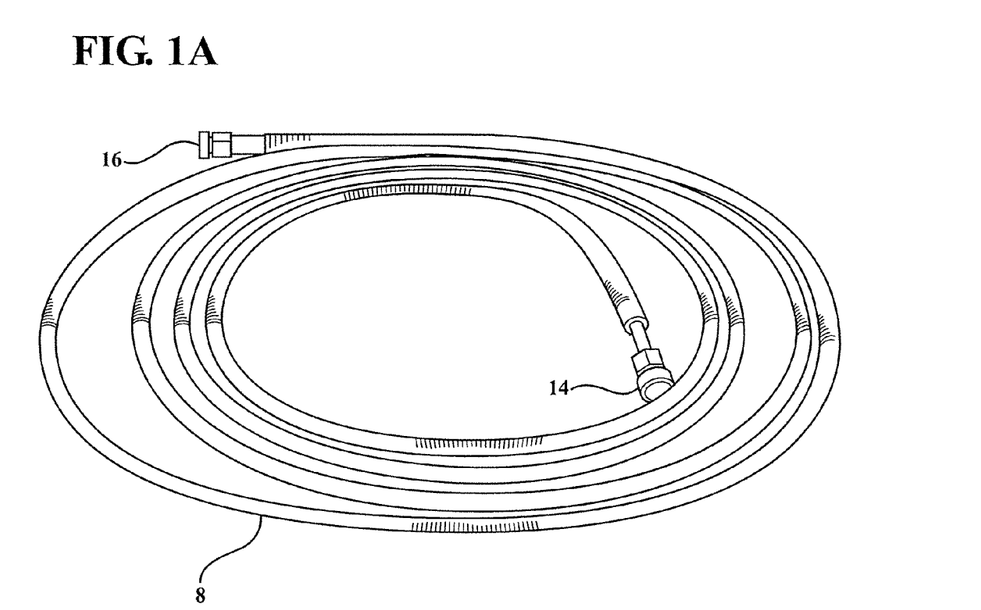
FIG. 1A is an illustration of a fill hose in a coiled state and which can be connected to a fitting associated with the fill adapter situated in communication with the tank.
Figure 1B:
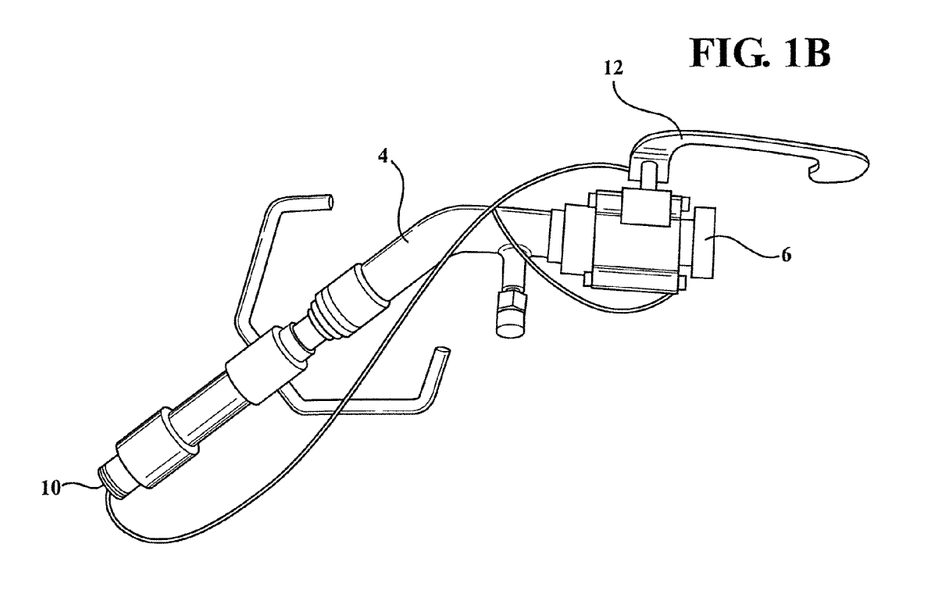
FIG. 1B is an enlarged illustration of the fill adaptor in FIG. 1 and further showing the threaded connection location with valve to which a selected end of the fill hose is connected.

Referring first to FIG. 1, an environmental view is shown at 2 of a pressurized fluid delivery tank, with which is incorporated the scale assembly according to the present invention. As shown, the tank 2 includes various pressurization, control and readout features as is known in the technical art, as well as providing (typically at a lower end) a liquid fill connection 4 for providing a desired volumetric quantity of a gas or liquid (fluid) associated with a customer delivery.

Among other features, the fill connection 4 includes a threaded attachment (outlet) location 6 for receiving a selected end of a hose 8 (FIG. 1A), the fill connection including an opposite end 10 in communication with the tank interior. A valve 12 is mounted to the fill connection and includes any of a check, ball or other type interior mechanism for communicating fluid flow from the tank 2 through the outlet location 6. As further shown in FIG. 1A, hose 8 is depicted in coiled fashion and includes attachment ends 14 and 16 for engaging, respectively, the fitting end location 6 and a fill inlet location (not shown) associated with the customer tank or cylinder.

Without limitation, the tank 2 can be used to delivery any suitable commercial fluid (gas or liquid) not limited to a cryogenic fluid or any other gas or liquid having commercial or scientific value and for which effective and accurate metering during delivery is desired. As further previously stated, the conventional art utilizes a liquid flow meter, these having a reputation of being costly and of limited accuracy and reliability.

Figure 2:
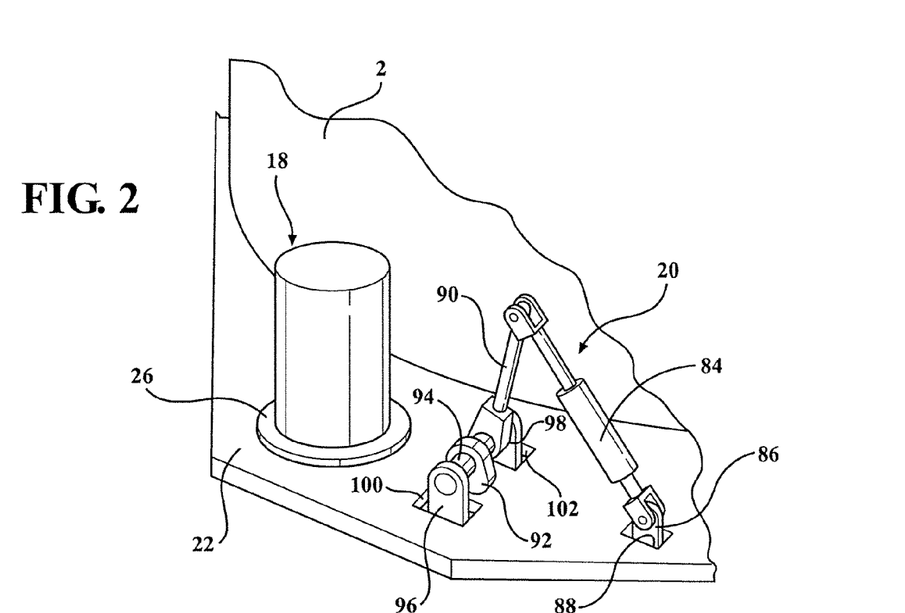
FIG. 2 is an enlarged partial view of a selected perimeter located combination of a fluid elevating (air) cylinder/load cell subassembly for lifting the fluid delivery tank above a pallet supporting surface prior to zeroing out of the digital scale to initiate fluid delivery, in combination with the air cylinder release of the spring loaded hold down linkage with rotatable cam lock for enabling incremental elevation of the tank by the perimeter located air cylinders.

In application, the metering assembly according to one preferred embodiment discloses a plurality of individual lift cylinders 18 and associated spring loaded hold down linkages 20, such as are generally referenced in FIG. 2. One non-limiting variant of the invention contemplates a plurality of four corner located lift cylinder/hold down linkages, and such as which are arranged with a lower flange/lip 22 location associated with a base of the tank 2, such as which in turn is supported upon a pallet 24 (FIG. 1) or other suitable platform support having a planar upper surface upon which the tank 2 and lower support lip 22 are arranged.

The concept behind the present invention is to provide a less costly and more accurate system for determining a weight or volumetric delivery of a fluid from the tank 2 than is currently available from known liquid flow meters. The present invention enables this by wiring the four (or other desired number) lift cylinders 18 with load cells in parallel with a digital/electronic readout scale represented in a non-limiting fashion at 26 in FIG. 2 and including any of a flat support surface or, more typically, a contact location associated with each of the load cells associated with the perimeter arranged lift cylinders.

As will be further described in more detail, the electronic scale 26 can include any module or other construction which communicates between the underside of the lift cylinders 10 supporting the elevated tank 2 and surrounding lip 22 and the underneath located support surface of the pallet 24. Without limitation, the scale 26 can include any digital or electronic module which can be arranged in any manner or configuration in association with the tank and so that, upon the tank being sufficiently elevated above the platform, the scale is employed to provide (such as in contact with the load cells associated with the lift cylinders as will be further described) an initial weight (e.g. zeroed out reading) of the tank 2 prior to initiating fluid delivery. As will be further described, the scale is subsequently employed to further provide a completed weight of the tank after delivery, the delivered fluid being calculated as an aggregated weight, this further converting to a desired volumetric delivery rated in cubic feet in the instance of gaseous fluids of product delivered from the tank.

As previously described, one operating variant of the invention requires that the tank 2 be lifted/elevated a minor distance (such as ¼" to ½") above the supporting platform surface 24 below the tank 2. This is further depicted in the plan cutaway of FIG. 3 in which a cylindrical shaped covering cap 28 incorporates an (upper positioned) air cylinder 30 and (intermediate) load cell. A lower extending load cell button 34 (shown as a bulbous or spherical underside projection) associated with the load cell 30 seats within a pseudo concave recess 36 associated with an upward projecting cone 38 forming an aligning platform support location.

Figure 3:
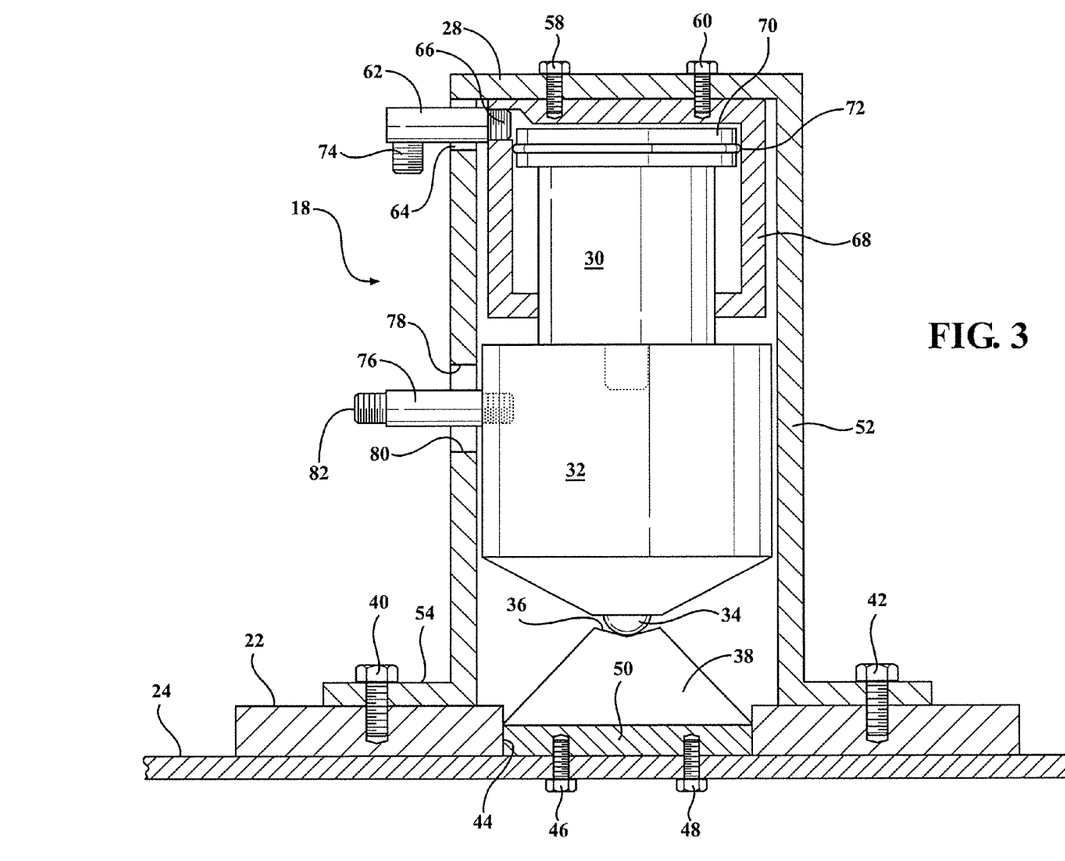
FIG. 3 is a plan cutaway illustrating an interior structure of a selected air cylinder/load cell and illustrating the manner in which it is elevated an approximately ¼" to ½" to allow scale resetting and subsequent weight calculated metering of fluid from the supported tank.

The load cells 32 are each linearly displaceable relative to the inner vertical surface of the cap 28 in a manner which ensures that it does not rub there against and so as to not compromise the accuracy of the digital reads resulting therefrom. As further shown, the cap 28 is bolted (at 40 and 42) to the base of the tank flange 22 in surrounding and aligning fashion with an interior aperture (see inner perimeter wall 44) of the flange 22 and through which upwardly projects the seating cone 38. Additional bolt fasteners are depicted 46 and 48 for securing a base surface 50 of the cone 38. An outer cylindrical housing 52 associated with each of the lift cylinders 18 includes a bottom lip or flange 54 through which seats the bolts 40 and 42.

As will be described in furthering detail, the cone porpoises when the tank 2 is released to the down position and before locking down of the spring loaded and cam driven linkage. As further depicted in FIG. 2C, a scale control box 56 is illustrated according to one non-limiting embodiment and which is incorporated into each of four individual load cell interfaces (see at 34, 36 and 38 in FIG. 3) associated with each of four corners of the tank 2.

Without limitation, the terms load cell and scale are intended to collectively describe a mechanism and process for elevating, recalibrating and weighing the tank 2 in a manner so as to provide a highly accurate reading of a weight of removed fluid (and subsequent calculated volume based upon known equations and corrections based on environmental conditions including temperature, pressure, etc.). To this end, the construction of the scale 26, control box 56 and associated load cell subassemblies (such as again including any plurality such as 4 located about the perimeter of the lower support 22 of the tank 2) is such that they are subject to any necessary redesign or reconfiguration in order that they work collectively in order to provide (in a collective/parallel operating fashion) the weight of the removed fluid.

Additional features depicted in the FIG. 3 cutaway include upper located mounting bolts 58 and 60 for securing the air cylinder 30 to the upper inner end of the cap 28. A nipple fitting 62 extending from an inlet location 64 of the outer housing 52 and engages at an inner end 66 to an inner housing 68 within which the air cylinder 30 vertically travels. The air cylinder also includes an enlarged and upper edge located portion 70 exhibiting a perimeter seal or gasket 72. An attachment fitting associated with an end of a pressurized hose (not shown) is engaged to a threaded attachment end 74 of the fitting 62, and such as which can further extend from the main tank 2 or a separate pressurized (lift) tank.

A separate fitting 76 extends laterally from the load cell 32 and projects through an opening defined in the vertically extending sidewall 52 (see upper 78 and lower 80 spaced edges). The fitting 76 is connected by an input (not shown) associated with a digital scale module (also not shown) and which engages a further projecting and threaded attachment end, at 82, of the fitting 76.

As previously described, the selected number of load cylinders (typically four but not limited to any particular number) are wired in parallel to the digital scale module and so that their aggregated readings (determined from load forces exerted by each of the perimeter arrayed load cell buttons 34 against their associated concave seating recesses 36) are totaled in order to determine an existing weight of the (fluid filled and pressurized) tank 2.

Elevation of the tank 2 above the platform surface 24 is desired in a first step to enable the digital scale module to be interposed and, according to one non-limiting application or protocol, the lifting forces of the cylinders are released so that the tank solidly rests upon the scale, which is zeroed out or recalibrated. Following this, a weight measured (and volumetric convertible) variable can be determined for providing highly accurate measurement of dispensed fluid. Given the portable nature of the fluid delivery service with which the tank 2 is employed, i.e. it is usually mounted upon the bed of a truck or similar vehicle so that fluid delivery can be accomplished at the customer site via an extending hose from the fluid connection 4 of the delivery tank 2 to the customer receiving/storage tank (not shown).

In order to prevent undesirable movement or shifting of the tank 2 when supported upon the vehicle bed, a plurality of spring loaded hold down linkages 20, each with rotatable cam lock, are provided in a like plural (and typically paired fashion) with each lift cylinder 18 for enabling incremental elevation of the tank by the perimeter located air cylinders. The construction of the hold down linkages 20 are such that, when not influenced by a bias-countering pressurizing force, an integrated spring within a cylinder 84 (again FIG. 2) defaults to a rotated locking/hold down position, normally locked down.

As further depicted in FIG. 2, the cylinder 84 establishes a pivotal interconnection at a lower angled end with a pedestal support bracket 86 (this projecting through an aperture 88 defined in the tank supporting lip or flange 22), the cylinder 84 being engaged and at an upper angled end with a lever arm 90. The cylinder 84 can further integrate an inner spring (not shown) and which in use biases the pivotal direction of the hold down linkage in a locked position such that the lever arm 90 is in turn in rotary engagement with a cam 92, which in the normally biased position includes a configured outer surface which engages the upper surface of the flange 22 to hold the tank down. The cam 92 is shown according to one non-limiting representation and is associated with a shaft 94 extending between end supports 96 and 98, these likewise supported (affixed) upon the pedestal 24 and extending through additional aligning apertures (see rectangular inner perimeter cutouts 100 and 102) in the tank support flange 22.

In one non-limiting variant, a pressurized air or other fluid source is communicated to the spring loaded cylinder 84 (and which can be supplied by the main tank 2 or an independent pressure source, and/or communicated from or through the air cylinder 30 incorporated into a correspondingly placed lift cylinder 18. The fluid source communicated to the spring loaded cylinder 84 operates to counter-act the rotating force exerted by the spring cylinder against the cam 92 (in a normally hold down or locking position) and in order to execute a counter rotation (such as a ¼ or 90° turn) to thereby rotate unseat the abutting ledge surface of the cam 92 from a holddown contact with the upper surface of the tank support flange 22.

Figure 2A:
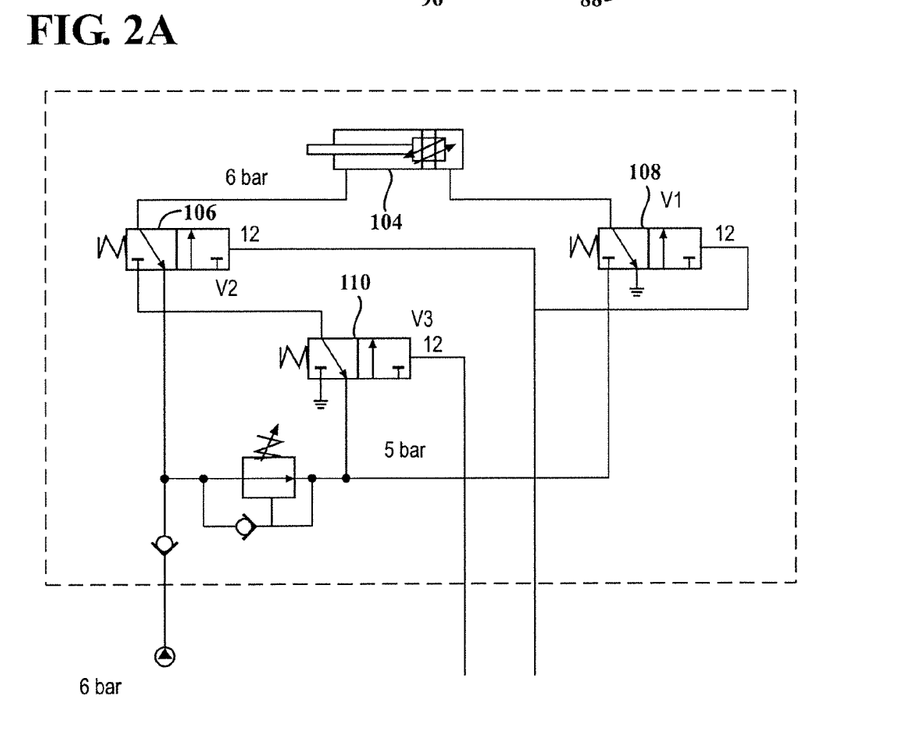
FIG. 2A is a schematic illustration and FIG. 2B a succeeding structural illustration of a valving construction according to one non-limiting application, located at the interface between the lift cylinder and the assist cylinder associated with the hold-down linkage, and which operates to ensure that the hold down linkage assist cylinder is fully engaged/released, before lift pressure is applied to the air lift cylinder.
Figure 2B:
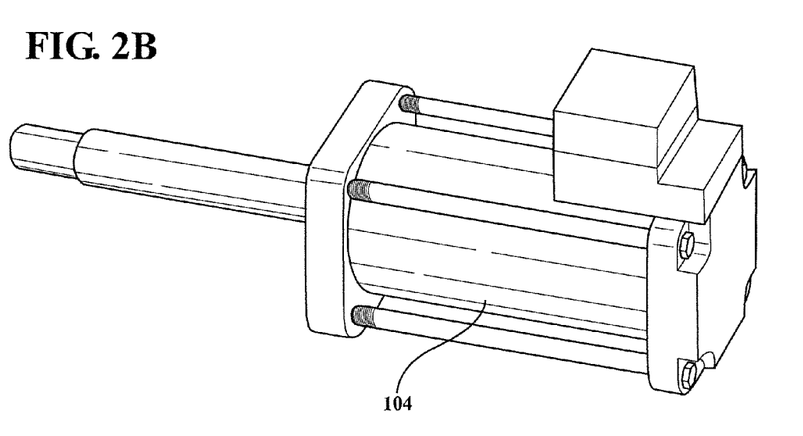
Figure 2C:
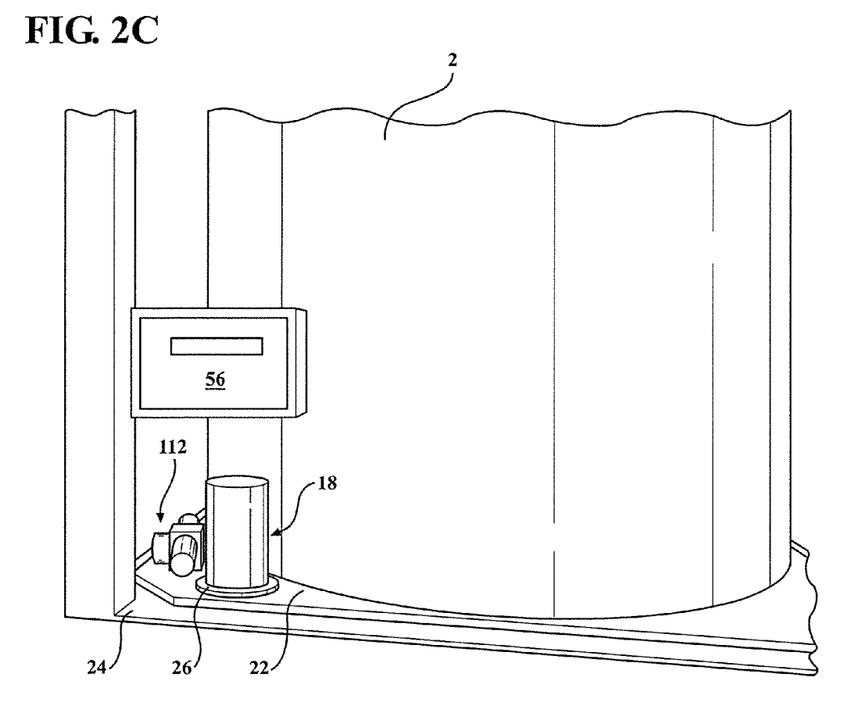
FIG. 2C is an illustration of a scale control box according to one non-limiting embodiment and which is incorporated into each of four individual load cell interfaces (associated with each of four corners of the tank.

Referring to FIGS. 2A and 2B, both schematic and structural illustrations are shown of a valving construction 104 according to one non-limiting application, such as which is located at the interface between each lift cylinder 30 and assist cylinder 84 associated with the hold-down linkage, and which operates to ensure that the hold down linkage assist cylinder is fully engaged/released, before lift pressure is applied to the air lift cylinder. As further depicted in FIG. 2A, a similar valving construction 104 is located at each interface between linkage spring assist cylinder 84 and the (load cell) lift cylinder 30, such valve at each interface is connected in series to ensure that the hold down linkage cylinder 84 is fully engaged (to the release position) before air can be admitted from the lift cylinder 30 in order to elevate the tank 2 and support lip 22 above the platform surface.

The safety aspects of the feature of FIGS. 2A-2B include preventing damaging of the load cells in attempting to lift a tank which has not been fully released by the hold down linkages, this by requiring that the hold down linkage and cylinder are fully engaged/opened in order to allow a valving arrangement (see as represented at 106, 108 and 110) to open the airflow through the load cylinder only upon all of the cylinders (again at 84) associated with each hold down linkage being actuated to the fully opened position, thereby allowing pressurized airflow to each of the perimeter located lift cylinders 30 in parallel fashion, and in order to evenly lift the tank 2.

As previously indicated, the release position allows for subsequent elevation of the tank 2 by the adjoining lift cylinders 18 a nominal distance, such as ¼" to ½", sufficient to zero out the digital scale and to permit subsequent and highly accurate weight measurement of withdrawn fluid, with weight to volumetric conversion to determine a volume of fluid delivered to the customer. Upon termination of the air pressurization force to both the lift cylinders 18 and the spring loaded cylinder 84 in the hold down linkage, the tank 2 and bottom supporting lip/flange 22 re-seats upon the pallet support (e.g. 24 in FIG. 1) and the spring loaded cylinder 84 rotates the cam 92 (FIG. 2) back into hold-down position in a fail-safe lock mode.

Figure 4:
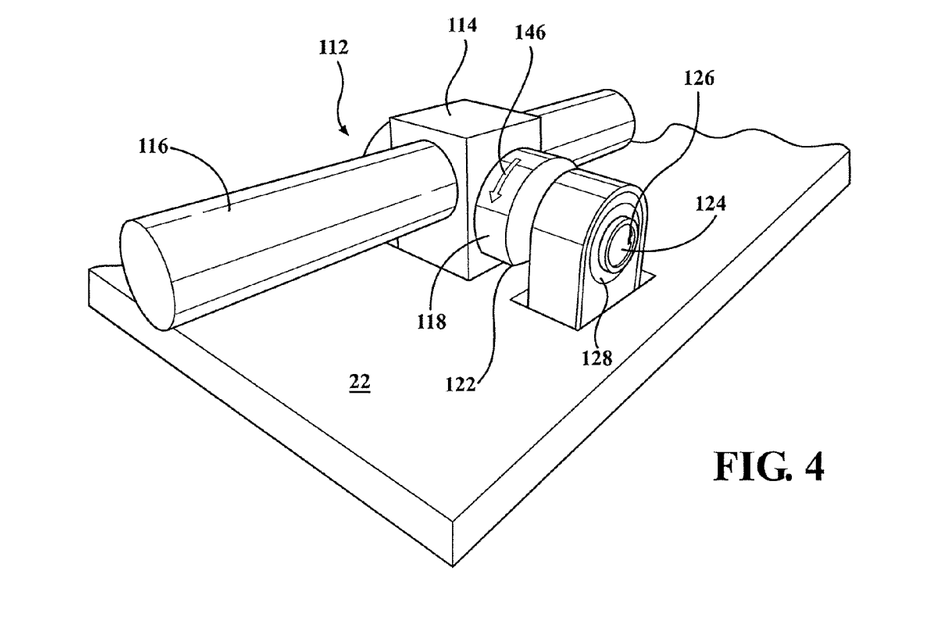
FIG. 4 is a first sectional perspective of an example of a cam-operated linkage according to a further construction and for providing pressurized release of an adjoining perimeter location corresponding to placement of an accompanying air-lift cylinder.
Figure 5:
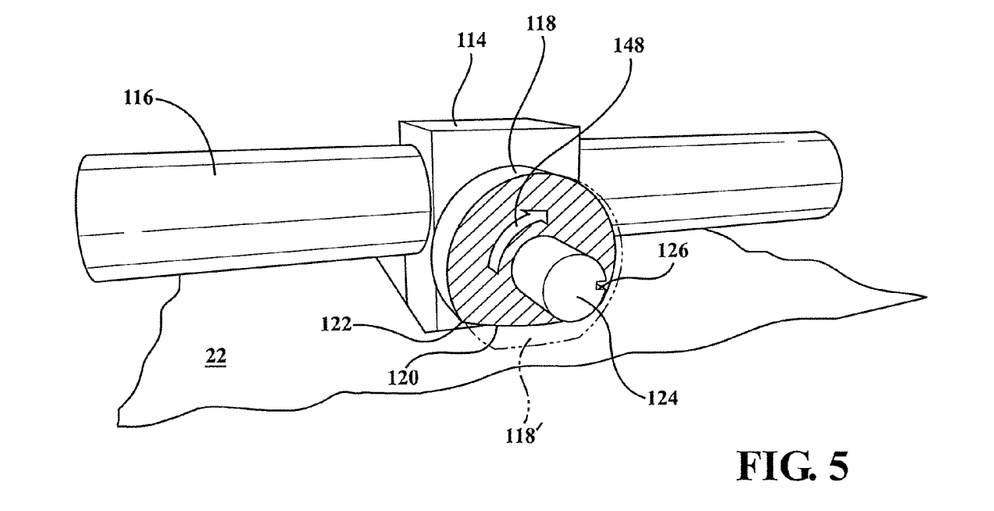
FIG. 5 is a rotated and partially cutaway view depicting a cam-edge profile which rotates over a desired angular range in order to provide either hold-down or release of the fluid delivery tank to be elevated by the perimeter located air cylinders.

Referring to FIGS. 4-5, first and second perspective illustrations are provided of an alternate construction of the camdriven hold down linkage previously depicted at 20 in FIG. 2. In particular, FIG. 4 is a first sectional perspective of an example of a cam-operated linkage, generally at 112, according to a further construction and for providing pressurized release of an adjoining perimeter location corresponding to placement of an accompanying air-lift cylinder. Reference is also made again to FIG. 2C which illustrates the linkage 112 in configuration with the lift cylinder 16.

Similar to the previously disclosed variant, the cam linkage is mounted atop the pallet support surface 24 associated with the mobile platform (e.g. truck bed) or other supporting surface for the tank 2. A rotary actuator 114 is depicted as a three dimensional rectangular housing, through which extends an air cylinder subassembly 116 (such as shown in one non-limiting variant extending approximately 5" from either end of the actuator housing).

A cam component 118 includes an arcuate outer profile with a flattened portion 120 defining a pointed edge location 122 with the outer arcuate profile. The cam component 118 is supported upon an exterior face of the rotary actuator 114, and through which extends a shaft 124 with a keyed or notched end 126 (see edge proximate the three sided slot defined in the shaft), the same being in turn supported by a pillow block bearing 128 for providing an optional extra degree of support.

Figure 4A:
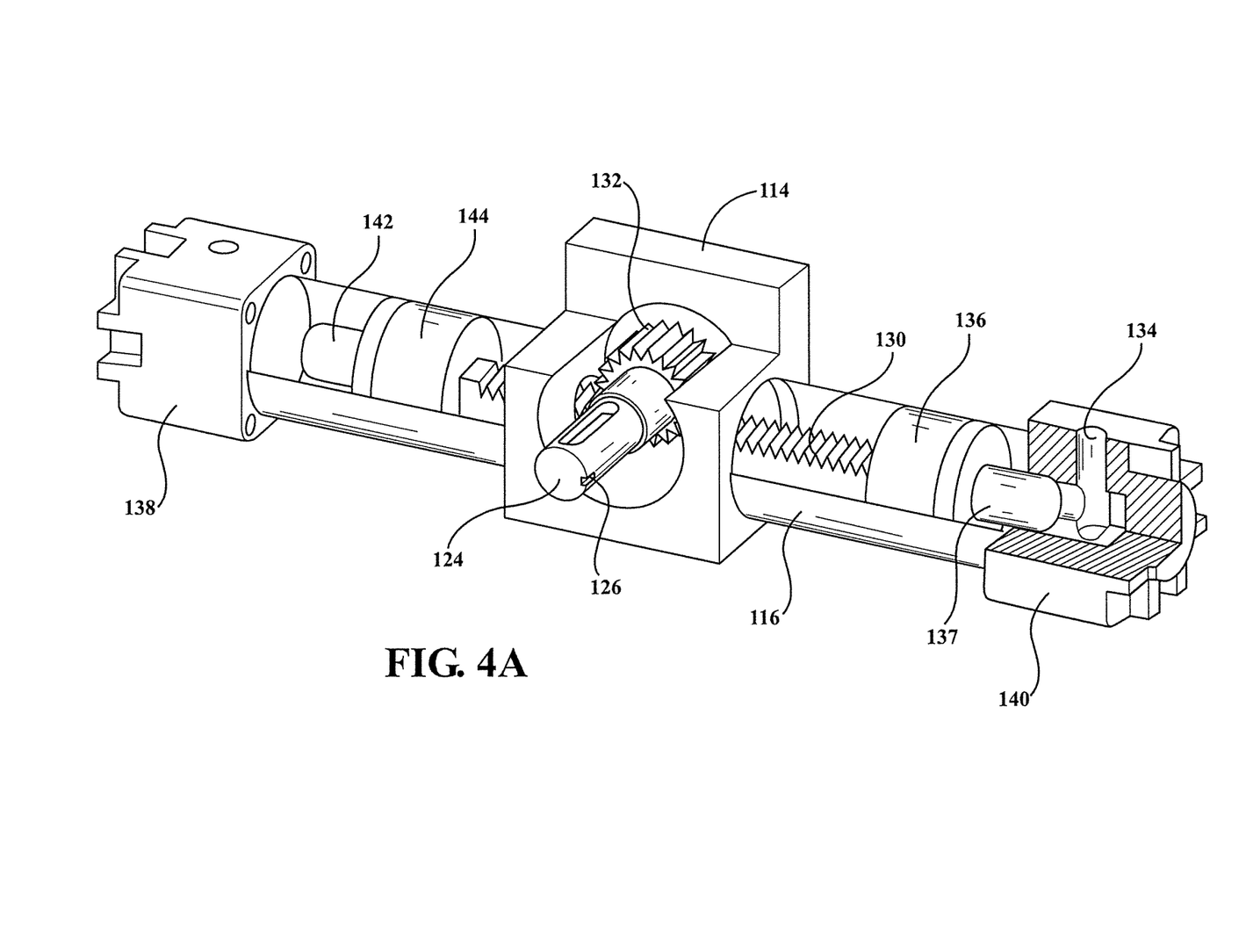
FIG. 4A is a cutaway view of an air cylinder subassembly associated with the linkage of FIG. 4.

As further best shown in the cutaway of FIG. 4A, the air cylinder 116 provides a subassembly incorporating a rack and pinion gear arrangement, see rack gear 130 with serrated upper edge facing teeth, and which engages a rotary pinion gear 132 associated with the output shaft 124, the rotary gear 132 shown in cutaway with additional teeth which inter-engage with those extending along the upper surface of the rack gear 130. In operation, an inlet port 134 is provided in the cylinder 116 and to which a pressurized air input source (not shown) is connected. A first piston 136 is mounted to an end of the rack gear 130, with a first projecting chusion spear 137 which seals against the inlet port 134 and which, in response to the pressure input through the inlet port 134, actuatees the rack gear 130 to rotate the pinion gear 132 and associated output gear 124, with the cam 118 rotating in a manner in which its angled edge location 122 contacts the upper facing surface of the tank support flange 22 in a normally biased hold down fashion.

The air cylinder 116 of FIG. 4A further exhibits such features as a pair of opposite mounting ends 138 and 140, as well as a second chusion spear 142 extending from a second and opposite end located piston 144, in proximity with the selected end 138 for supporting the rack gear 130 in its linear co-directional (back and forth) travel. Consistent with the hold down linkage 20 of FIG. 102, the central located rotary actuator 114 can be mounted to the pallet support 24 and can extend through a suitable window aperture formed in the tank support flange 22 in order to no interfere with elevation of the flange and perimeter supported tank above the pallet or other support surface 24.

FIG. 5 is a rotated and partially cutaway view depicting the cam 118 in cutaway and which rotates (see arrows at 146 in FIGS. 4 and 148 in FIG. 5) in either of opposite directions and over a desired angular range (such as approximately 70° in one non-limiting application) in order to provide either hold-down (see phantom designation of cam at 118' in FIG. 5) or release (solid designation of cam 118) of the fluid delivery tank 2 to be elevated by the perimeter located air cylinders above the platform support surface 24, such as in an increased range of up to 1½" as compared to the earlier variant.

Figure 6:
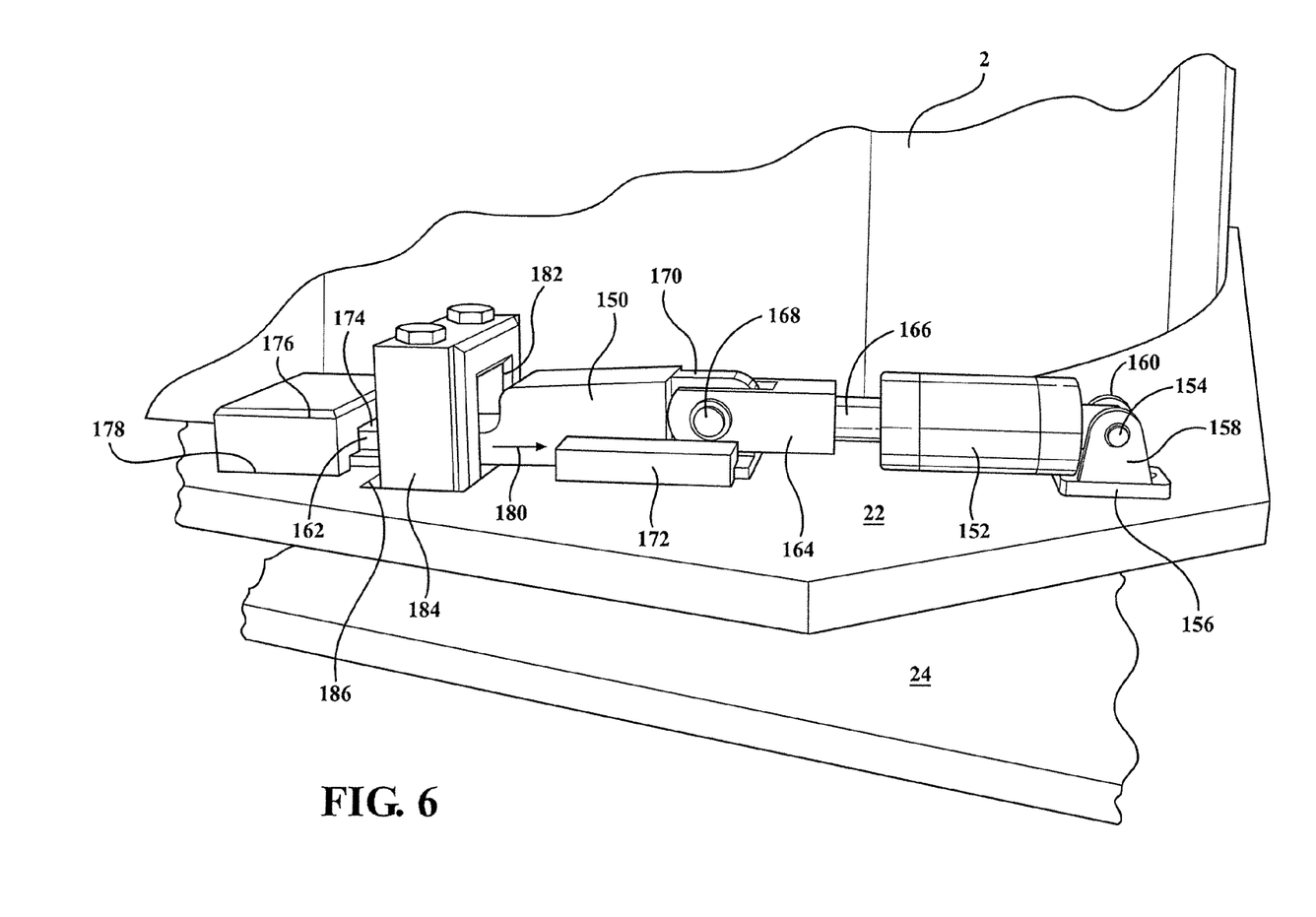
FIG. 6 is an illustration of an alternate variant of hold-down mechanism utilizing a horizontally disposed wedge component in end displaceable engagement with a spring containing air lift cylinder, the wedge component displacing between a relaxed/extended position in engagement with a seating pocket defined in a projection of the pallet support through an aperture in the tank elevating flange or lip, to an energized/retracted position in which the wedge component is unseated from the seating pocket and aligning only through a doorway defined in a tower portion which permits a range of vertical elevation necessary for zeroing out the digital scale.

Referring finally to FIG. 6, an illustration is shown of an alternate variant of hold-down mechanism utilizing a horizontally disposed wedge component 150 arranged in end displaceable engagement with a hold down cylinder 152 (similar in general design and operation to that previously depicted at 84 in FIG. 2). The hold down cylinder 152 is pivotally supported, at 154, to a bracket having a base 156 and including a pair of spaced apart ears 158 and 160 project upwardly from the base 156 which is mounted to a surface location of the tank support flange or lip 22.

The air cylinder 152, similar to the previously described variants, also includes an internal spring (not shown). Upon being provided with an input pressurized fluid (liquid or gas) from any source as previously described, the cylinder 152 causes the wedge component 150 with its end projecting finger 162 to retract, via an intermediate pivotal interconnecting structure/clevis 164 mounted to the end of a linearly displaceable shaft 166 associated with the cylinder 152. The clevis 164 includes a pair of spaced ears defining a slot therebetween which receives a rear extending and narrowed planar surfaced portion 170 of the wedge component 150, a pin 168 passing through aligning apertures in the clevis 164 and the rear projecting portion 170 in order to permit a degree of guided and pivotally induced retraction which is laterally supported by first and second guides (one of which is shown at 172) which is supported upon the flange 22

As further shown, a guide pocket 174 is horizontally defined within an upper extending location of a superstructure 176 which projects upwardly from the pallet surface 24 and which is extends through an inner edge defined and seating aperture 178 in the tank support flange 22. In a fluid pressurizing (energized/retracted) position, the forward most extending finger 162 of the wedge component 150 is retracted from the guide pocket (see arrow 180) and such that, in the retracted position, align only through a doorway 182 defined in a tower 184 (also anchored to the uppers surface of the pallet 24 and extending through an edge defined and seating aperture 186) so as to accommodate a measured degree of elevation of the tank 2.

In this position, the air tank 2 is effectively unlocked from the pallet 24 in a manner similar to that as previously described, and an external lifting force applied to the tank 2 permits the same to be elevated a requisite range necessary for zeroing out the digital scale (such as according to any of the variants previously described) and subsequently weighing a volume of delivered fluid as also previously described. As also shown, the doorway 182 and guide pocket 174 are arranged in linear alignment relative to the horizontal displacement of the wedge component 150, as further ensured by aligning superstructure 176 and tower 184 extending through the seating apertures 178 and 186 of the lip/flange 22 and which ensure alignment and horizontal displacement of the wedge component 150 between extended (locked) and retracted (released) positions.

Upon discontinuing the air pressure input (not shown) to the cylinder 152, the internal spring causes the linear extending shaft 166 and end supported wedge component 150 to extend back into sliding engagement with the pocket 174 of the outermost located superstructure 176, thereby locking tank 2 and associated lip/flange 22 into engagement with the pallet support 24. As with the previous described variants, any number of combination of the cam lock subassemblies can be utilized, such as with the air cylinders 18 also depicted in FIG. 2, and in a perimeter spaced arrangement about the circumference of the outer supporting lip or flange 22 of the elevatable tank 2.

Without limitation, the present invention contemplates any type of lever or force transfer linkage which facilitates release of the supporting flange 22 of the tank 2 from the pallet surface, with incremental elevation thereafter facilitated by the air cylinders or other supporting structure for elevating and lowering the tank 2 to the extent necessary to clear and activate the digital scale module. Yet additional variants contemplate combining the lift cylinders and linkages into a single dual purpose component, such as which is placed in plural fashion along corners or other perimeter spaced apart fashion in order to facilitate both vertical actuation and highly accurate metered reading of weight and converted volume of delivered fluid.

Having described my invention other and additional preferred embodiments will become apparent to those skilled in the art to which it pertains, and without deviating from the scope of the appended claims. This can include, without limitation, incorporating any style of leveling assist or like indicating mechanism into the pallet or flange supporting portions of the present assembly, this in further recognition of the fact that incremental errors (such as on the order of 0.4%) in underreporting of delivered fluid weight/volume can result in instances where the support surface under the tank is tilted at an angle up to 5° from the horizontal.

I claim:

1. A scale assembly for determining a weight of a fluid withdrawn from a tank arranged upon a support surface, said assembly comprising:
   at least one lift cylinder in contact with both the support surface and a flange associated with a lower support location of the tank;
   at least one cam driven linkage adapted to being mounted to the support surface and which is normally biased in a first position so as to contact an upper surface of the flange to restrain the tank into contact with the support surface, said linkages being actuated in a second position away from the upper flange surface to release the tank for subsequent elevation a distance above the support surface upon actuation of said lift cylinders; and
   a load cell arranged in communication between each of the lift cylinders and the support surface, said cell communicating with an electronic scale which is recalibrated prior to withdrawing fluid from the tank and in order to subsequently measure at least a weight of the fluid delivered therefrom.

2. The scale assembly as described in claim 1, further comprising a plurality of lift cylinders and cam linkages arranged in paired and perimeter spaced fashion about a perimeter of the tank in extending fashion through the support flange.

3. The scale assembly as described in claim 1, each of said lift cylinders further comprising a covering cap incorporating an air cylinder positioned above said load cell, a lower extending load cell button associated with said load cell seating within a recess associated with an upward projecting cone forming an aligning platform support location.

4. The scale assembly as described in claim 3, further comprising each of said load cells each being displaceable relative to an inner vertical surface of said covering cap to avoid compromising the accuracy of the digital reads resulting therefrom.

5. The scale assembly as described in claim 3, further comprising said covering cap being bolted to a base of the tank flange in surrounding and aligning fashion with an interior aperture of the flange and through which upwardly projects said seating cone.

6. The scale assembly as described in claim 5, further comprising upper located mounting bolts for securing said air cylinder to the upper inner end of said cap.

7. The scale assembly as described in claim 6, further comprising a nipple engageable attachment fitting projecting from said air cylinder through said cap and adapted to receive a pressurized air supply.

8. The scale assembly as described in claim 7, further comprising a separate fitting extending from said load cell and projecting through an opening defined in the vertically extending sidewall of said covering cap, said fitting adapted to being connected by an input associated with said scale.

9. The scale assembly as described in claim 1, each of said cam linkages further comprising a spring loaded cylinder establishing a pivotal interconnection at a lower end with a pedestal support bracket, and at an upper end with a lever arm, in turn established in rotary engagement with a cam associated with a shaft extending between end supports which are likewise supported upon the support surface and extend through additional aligning apertures in the flange associated with the lower tank supporting location.

10. The scale assembly as described in claim 9, further comprising a pressurized fluid source communicated to said spring loaded cylinder to counter-act a rotating force exerted by said spring cylinder against said cam in a normally hold down or locking position and in order to execute a counter rotation to thereby rotate unseat an abutting ledge surface of said cam from a hold-down contact established with an upper surface of said tank support flange to a release position, allowing for subsequent elevation of the tank by said lift cylinders a nominal distance sufficient to zero out a digital scale module and to permit measurement of withdrawn fluid, with weight to volumetric conversion to determine a volume of fluid delivered to the customer, upon termination of the air pressurization force to all said lift cylinders and said spring loaded cylinder, the tank and flange re-seating upon the pallet support location and said spring loaded cylinder rotating said cam back into hold-down position in a fail-safe lock mode.

11. The scale assembly as described in claim 1, each of said cam linkages further comprising a rotary actuator exhibiting a three dimensional rectangular housing, through which extends a cylindrical cross sectional and elongated support, a cam component supported upon an exterior face of said rotary actuator and through which extends a further shaft with a keyed end, the same being in turn supported by a pillow block bearing for providing an optional extra degree of support.

12. The scale assembly as described in claim 11, further comprising said cam being rotated over a desired angular range in order to provide either hold-down or release of the fluid delivery tank to be elevated by said perimeter located air cylinders.

13. The scale assembly as described in claim 12, each of said cam linkages further comprising a horizontally disposed wedge component arranged in end displaceable engagement with a spring containing air lift cylinder, said lift cylinder pivotally supported to a bracket in turn is mounted to a surface location of the underlying pallet and which passes through an aligning recessed defined in said flange support location associated with said tank.

14. The scale assembly as described in claim 13, further comprising said spring containing air cylinder, upon being provided with an input pressurized fluid source, causing said wedge component to retract, via an intermediate pivotal interconnecting structure mounted to the end of a linearly displaceable shaft associated with said spring loaded cylinder.

15. The scale assembly as described in claim 14, further comprising a seating pocket defined in a superstructure projecting upwardly from the pallet and seating through an aperture in said tank support flange such that, in a fluid pressurizing (energized/retracted) position, forward most extending fingers of said wedge component are unseated from the seating pocket and such that, in the retracted position, align only through a doorway defined in a tower also projecting from the pallet and seating through a further aperture in said tank support flange, said tower being arranged in spaced aligning fashion with said superstructure.

16. A scale assembly for determining a weight of a fluid withdrawn from a tank arranged upon a support surface, said assembly comprising:
   at least one lift cylinder in contact with both the support surface and a flange associated with a lower support location of the tank;
   at least one cam driven linkage adapted to being mounted to the support surface and which is normally biased in a first position so as to contact an upper surface of the flange to restrain the tank into contact with the support surface, said linkages being actuated in a second position away from the upper flange surface to release the tank for subsequent elevation a distance above the support surface upon actuation of said lift cylinders;

each of said cam linkages further including a spring loaded cylinder establishing a pivotal interconnection at a lower end with a pedestal support bracket, and at an upper end with a lever arm, in turn established in rotary engagement with a cam associated with a shaft extending between end supports which are likewise supported upon the support surface and extend through additional aligning apertures in the flange associated with the lower tank supporting location; and a load cell arranged in communication between each of the lift cylinders and the support surface, said load cell communicating with an electronic scale which is recalibrated prior to withdrawing fluid from the tank and in order to measure at least a weight of the fluid delivered therefrom.

17. A scale assembly for determining a weight of a fluid withdrawn from a tank arranged upon a support surface, said assembly comprising:

at least one lift cylinder in contact with both the support surface and a flange associated with a lower support location of the tank;

at least one cam driven linkage adapted to being mounted to the support surface and which is normally biased in a first position so as to contact an upper surface of the flange to restrain the tank into contact with the support surface, said linkages being actuated in a second position away from the upper flange surface to release the tank for subsequent elevation a distance above the support surface upon actuation of said lift cylinders;

each of said cam linkages further including a rotary actuator exhibiting a three dimensional rectangular housing, through which extends a cylindrical cross sectional and elongated pressurized cylinder incorporating rack and pinion gears, a cam component supported upon an exterior face of said rotary actuator and through which extends a further shaft with a keyed end, the same being in turn supported by a pillow block bearing for providing an optional extra degree of support; and a load cell arranged in communication between the lift cylinders and the support surface, said scale being recalibrated prior to withdrawing fluid from the tank and in order to measure at least a weight of the fluid delivered therefrom.

\* \* \* \* \*